United States Patent [19]

Yazaki et al.

[11] Patent Number: 4,590,131
[45] Date of Patent: May 20, 1986

[54] PACKAGING MATERIAL

[75] Inventors: Jinichi Yazaki; Kazuhiko Tsurumaru, both of Tokyo, Japan

[73] Assignee: Toyo Seikan Kaisha, Ltd., Tokyo, Japan

[21] Appl. No.: 658,166

[22] Filed: Oct. 5, 1984

[30] Foreign Application Priority Data

Feb. 17, 1984 [JP] Japan .................................. 59-27353

[51] Int. Cl.$^4$ ............................................. B32B 27/08
[52] U.S. Cl. ..................................... 428/516; 428/35; 525/59; 525/60
[58] Field of Search ..................... 428/516, 35; 525/59, 525/60; 426/106; 215/1 C

[56] References Cited

U.S. PATENT DOCUMENTS

| | | | |
|---|---|---|---|
| 3,560,325 | 2/1971 | Sogi et al. ............................ | 428/516 |
| 4,064,296 | 12/1977 | Bornstein et al. ...................... | 428/35 |
| 4,082,854 | 4/1978 | Yamada et al. ........................ | 428/35 |
| 4,239,826 | 12/1980 | Knott et al. ............................ | 428/35 |
| 4,254,169 | 3/1981 | Schroeder .............................. | 428/35 |
| 4,464,943 | 8/1984 | Farrell et al. .......................... | 428/35 |

Primary Examiner—Edith Buffalow
Attorney, Agent, or Firm—Sherman and Shalloway

[57] ABSTRACT

Disclosed in a packaging material having at least one layer comprising an ethylene-vinyl alcohol copolymer having a vinyl alcohol content of 40 to 80 mole % and a residual vinyl ester content lower than 4 mole %, wherein the ethylene-vinyl alcohol copolymer consists of a composition comprising a plurality of copolymers differing in the vinyl alcohol content, said composition shows a plurality of endothermic peaks in a fusion curve by a differential scanning calorimeter, the composition has fusion characteristics satisfying requirements represented by the following formulae:

$$0.8 \geq \frac{Sc}{Sa + Sb + Sc} \geq 0.3$$

and $$Ta - Tb > 10° C.$$

wherein Sc represents an area of a triangle defined by a base line connecting the skirt of a high temperature side peak to the skirt of a low temperature side peak in two adjacent peaks in said fusion curve and lines connecting the skirts of both the peaks to the trough between both the peaks, Sa represents an area of the high temperature side peak above said triangle, Sb represents an area of the low temperature side peak above said triangle, Ta represents a peak temperature of the high temperature side peak and Tb represents a peak temperature of the low temperature side peak, and the composition has a molecular weight distribution ($\overline{Mw}/\overline{Mn}$) of at least 2.5.

This packaging material is excellent in the gas barrier property, especially the oxygen permeation resistance under a high humidity condition, and the mechanical properties and processability.

9 Claims, 4 Drawing Figures

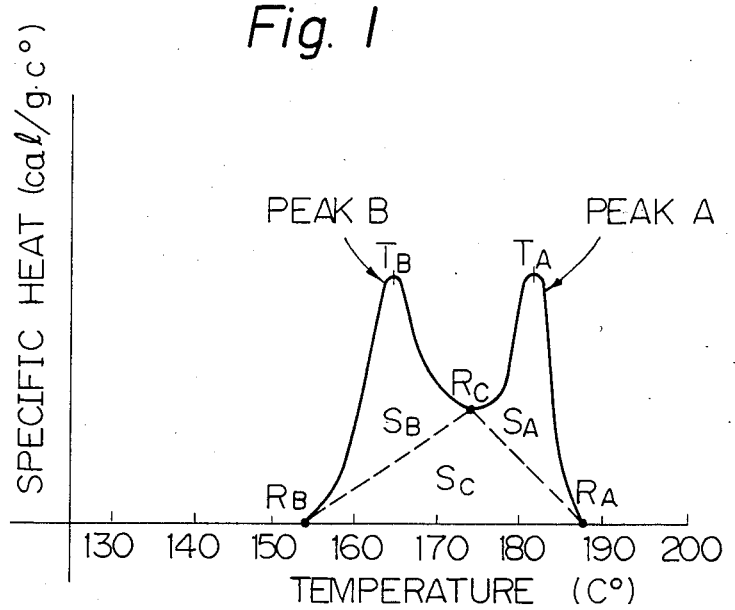
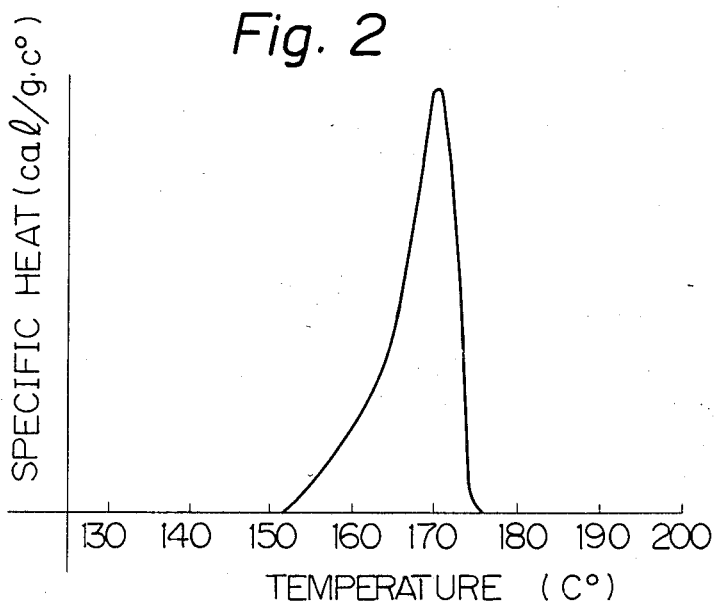

PACKAGING MATERIAL

BACKGROUND OF THE INVENTION (1) Field of the Invention

The present invention relates to a packaging material. More particularly, the invention relates to a plastic packaging material excellent in such properties as gas barrier property, especially oxygen permeation resistance under a high humidity condition, mechanical properties and processability, which is composed of a composition comprising a plurality of ethylene-vinyl alcohol copolymers.

(2) Description of the Prior Art

As is taught in the specification of U.S. Pat. No. 3,419,654, an ethylene-vinyl alcohol copolymer obtained by saponifying an ethylene-vinyl acetate copolymer is a thermoplastic resin which is melt-extrudable and excellent in the gas permeation resistance and is broadly used as various packaging materials. This saponified ethylene-vinyl acetate copolymer shows an excellent gas barrier property under a low humidity condition such as a relative humidity of 0%. However, this polymer is defective in that the oxygen permeation coefficient ($QO_2$) is as about 10 times under a high humidity condition such as a relative humidity of 100% and the polymer is poor in the mechanical strength and processability. Various proposals have heretofore been made on means for overcoming these defects. However, these proposals have merits and demerits.

For example, a typical method proposed for reducing the humidity dependency of the gas barrier property comprises sandwiching both the surfaces of a saponified ethylene-vinyl acetate copolymer (hereinafter referred to as "EVOH") with inner and outer layers of a moisture-resistant thermoplastic resin such as a polyolefin to form a laminate structure. According to this method, direct contact of EVOH with water or steam can be avoided, but absorption of the moisture into the EVOH layer through the polyolefin layer is caused and the gas barrier property of the EVOH layer is gradually reduced. As means for improving the steam permeation resistance of EVOH per se, there have been proposed a method in which the distribution of ethylene in EVOH is narrowed or the amount present of an ethylene homopolymer or vinyl alcohol homopolymer is reduced so that only a single endothermic peak appears in the fusion curve by a differential scanning calorimeter (see the specification of British Pat. No. 1,190,018) and a method in which EVOH is heat-treated under specific conditions so that a specific subsidiary endothermic peak based on the heat treatment appears in addition to the main endothermic peak in the fusion curve by a differential scanning calorimeter (see the specification of U.S. Pat. No. 4,082,854). However, even according to these proposals, the object of reducing the humidity dependency of the gas barrier property is not satisfactorily attained.

EVOH heretofore used for packaging materials has a molecular weight distribution ($\overline{M}w/\overline{M}n$) much smaller than 2.5, and it is still insufficient in mechanical properties such as impact resistance and elongation. Moreover, this EVOH is inferior to other generalpurpose resins in the processability in various molding operations such as extrusion molding and solid phase compression molding. As shown in the specification of the above-mentioned British patent, in an EVOH resin having a narrowed molecular weight distribution, the mechanical properties and processability are drastically reduced, and if this EVOH resin is subjected to draw forming or draw-blow forming, pinholes or cracks are readily formed in the resin layer.

Addition of a plasticizing substance to EVOH has been proposed to improve the mechanical properties and processability of EVOH. Indeed, these properties are improved by addition of a plasticizing substance, but this proposal is not practical because addition of a plasticizing substance results in drastic reduction of the gas barrier property of the resin.

SUMMARY OF THE INVENTION

We found that a composition comprising a plurality of ethylene-vinyl alcohol copolymers, which has specific fusion characteristics and molecular weight distribution described in detail hereinafter, is excellent in the gas barrier property, mechanical properties and processability and is very valuable in the use of packaging materials.

It is a primary object of the present invention to provide a packaging material which is excellent in the gas barrier property, especially the oxygen permeation resistance under a high humidity condition, the mechanical characteristics and processability.

Another object of the present invention is to provide a material which has a higher gas barrier property as compared based on the same vinyl alcohol unit content though it has a relatively broad molecular weight distribution, and which is excellent in the mechanical characteristics such as elongation, tensile strength and impact resistance and can be formed into a vessel such as a cup or bottle at a high draw ratio at temperatures within a broad range.

More specifically, in accordance with the present invention, there is provided a packaging material having at least one layer comprising an ethylene-vinyl alcohol copolymer having a vinyl alcohol content of 40 to 80 mole % and a residual vinyl ester content lower than 4 mole %, wherein the ethylene-vinyl alcohol copolymer consists of a composition comprising a plurality of copolymers differing in the vinyl alcohol content, said composition shows a plurality of endothermic peaks in a fusion curve by a differential scanning calorimeter, the composition has fusion characteristics satisfying requirements represented by the following formulae:

$$0.8 \geq \frac{Sc}{Sa + Sb + Sc} \geq 0.3 \quad (1)$$

and $$Ta - Tb > 10° C. \quad (2)$$

wherein Sc represents an area of a triangle defined by a base line connecting the skirt of a high temperature side peak to the skirt of a low temperature side peak in two adjacent peaks in said fusion curve and lines connecting the skirts of both the peaks to the trough between both the peaks, Sa represents an area of the high temperature side peak above said triangle, Sb represents an area of the low temperature side peak above said triangle, Ta represents a peak temperature of the high temperature side peak and Tb represents a peak temperature of the low temperature side peak, and the composition has a molecular weight distribution ($\overline{M}w/\overline{M}n$) of at least 2.5.

BRIEF DESCRIPTION OF THE DRAWINGS

FIG. 1 is a fusion curve of a composition used in the present invention.

FIG. 2 is a fusion curve of a single ethylene-vinyl alcohol copolymer.

DETAILED DESCRIPTION OF THE PREFERRED EMBODIMENTS

Figure 3:
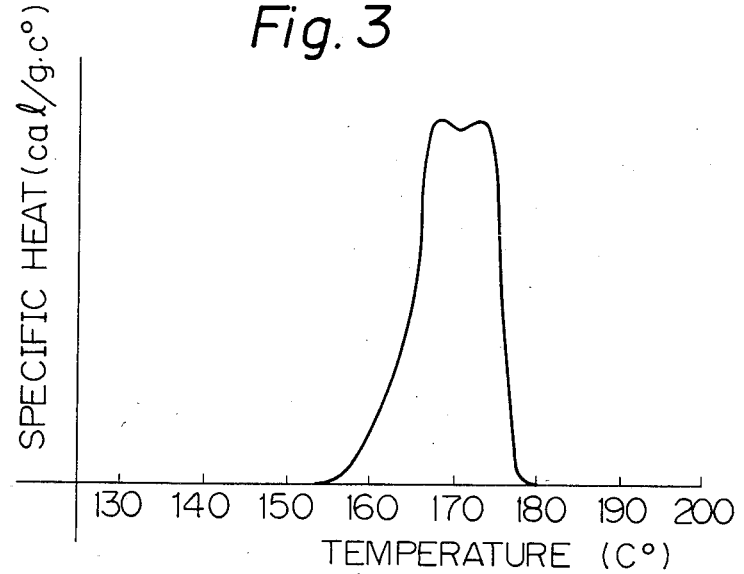
FIGS. 3 and 4 are fusion curves of compositions not satisfying the requirements of the present invention.

The present invention will now be described in detail.

The ethylene-vinyl alcohol copolymer used in the present invention is a copolymer prepared by saponifying a copolymer of ethylene with a vinyl ester of a lower fatty acid such as vinyl formate, vinyl acetate or vinyl propionate, especially an ethylene-vinyl acetate copolymer, as disclosed, for example, in the specification of U.S. Pat. No. 3,183,203 or 3,419,654.

It is important that each of the ethylene-vinyl alcohol copolymers used in the present invention should have a vinyl alcohol content of 40 to 80 mole %, that is, an ethylene content of 20 to 60 mole %. Namely, if the vinyl alcohol content in the copolymer is lower than 40 mole %, even when a composition of a plurality of copolymers satisfying the requirements of the fusion characteristics and molecular weight distribution described hereinafter is used, the permeation of gases such as oxygen is increased and the objects of the present invention are not attained. If the vinyl alcohol content exceeds 80 mole %, the hydrophilic property of the copolymer is increased and the water vapor permeability is increased, and moreover, the melt moldability or processability is degraded. Accordingly, this copolymer is not suitable for attaining the objects of the present invention.

The saponification degree of the ethylene-vinyl alcohol copolymer has serious influences on the oxygen permeation resistance of a formed vessel. In view of the gas permeation resistance of a formed vessel, it is important that the ethylene-vinyl alcohol copolymer used in the present invention should be a copolymer obtained by saponifying at least 96%, preferably at least 99%, of the vinyl ester of the starting ethylene-vinyl ester copolymer. Namely, it is important that the residual vinyl ester content in the copolymer should be lower than 4 mole %, preferably lower than 1 mole %. The ethylene-vinyl alcohol copolymer used in the present invention may be a saponified olefin-ethylene-vinyl ester copolymer in which a copolymerization olefin having 3 or 4 carbon atoms, such as propylene, butylene-1 or isobutylene, is copolymerized in an amount not having bad influences on the resistance to permeation of gases such as oxygen and carbon dioxide gas, for example, up to 3 mole %.

The ethylene-vinyl alcohol copolymer used in the present invention should have a film-forming molecular weight. In this connection, it is preferred to use a copolymer having an average polymerization degree ($\bar{P}$) of at least 500 based on the number average molecular weight.

In the present invention, it is indispensable to use a composition comprising a plurality of ethylenevinyl alcohol copolymers differing in the vinyl alcohol content, which are combined so that the fusion characteristics and molecular weight distribution described hereinafter can be obtained.

General fusion characteristics of ethylene-vinyl alcohol copolymers will now be described.

It is known that in an ethylene-vinyl alcohol copolymer, the higher is the vinyl alcohol content, the higher is the melting point of the copolymer. For example, it is known that the fusion peak in the differential thermal analysis is substantially in conformity with the following formula:

$$Y_1 = 1.64X + 68.0 \tag{3}$$

wherein $Y_1$ represents the main endothermic peak temperature (°C.) in the differential thermal analysis curve, and X stands for the vinyl alcohol content (mole %) in the ethylene-vinyl alcohol copolymer.

It also is known that in order to improve the melt moldability, a plurality of ethylene-vinyl alcohol copolymers differing in the ethylene content, that is, the vinyl alcohol content, are melt-kneaded and used for extrusion molding or injection molding. For example, Japanese Patent Publication No. 20976/83 discloses a kneaded composition comprising ethylene-vinyl alcohol copolymers in which the difference of the ethylene content is at least 3 mole %, said composition having a substantially single peak in the fusion curve thereof. It is taught that the composition is excellent in the melt moldability, though such troubles as unstable thickness, formation of fish eyes and reduction of the dimension stability are caused in a composition having two peaks.

In contrast, according to the present invention, it has been found that when a composition formed by combining a plurality of ethylene-vinyl alcohol copolymers so that in the fusion curve by a differential scanning calorimeter (DSC), there appear a plurality of endothermic peaks, the co-fusion index (Ic) represented by the following formula:

$$Ic = \frac{Sc}{Sa + Sb + Sc} \tag{4}$$

is 0.3 to 0.8, especially 0.35 to 0.6, and the peak temperature difference (dT) represented by the following formula:

$$dT = Ta - Tb \tag{5}$$

is larger than 10° C., preferably from 15° to 25° C. is used as a packaging material, the gas barrier property, mechanical properties and processability are highly improved.

The present invention will now be described with reference to the accompanying drawings.

FIG. 1 is a fusion curve of a typical instance of the ethylene-vinyl alcohol copolymer composition used in the present invention. This composition has two fusion peaks, that is, a high temperature side peak A and a low temperature side peak B. A skirt Ra is present in the high temperature side peak and a skirt Rb is present in the low temperature side peak, and a trough Rc is present between both the peaks. In the instant specification, the area of the fusion curve, that is, the quantity of heat, is divided into an area Sc of triangle RaRbRc defined by a base line connecting skirts Ra and Rb and two lines connecting the two skirts to the trough Rc, an area Sa of the high temperature side peak above said triangle and an area Sb of the low temperature side peak above said triangle. The total quantity of heat necessary for melting this composition is represented by the sum of the three areas, that is, Sa+Sb+Sc. It is considered that the area Sa is the quantity of fusion heat inherent to one copolymer component (I) corresponding to the peak A and the area Sb is the quantity of fusion heat inherent to the copolymer component (II) corresponding to the peak B. Accordingly, it may be said that the area Sc of the triangle is the quantity of heat necessary for co-melting both the components. The magnitude of this co-fusion is represented by the co-fusion index (Ic) of the above formula (A), and the degree of co-fusion of the peaks A and B can also be represented by the difference between the high temperature side peak temperature Ta and the low temperature side peak temperature Tb, that is, the above-mentioned formula (5) of dT=Ta−Tb.

The state of the presence of the ethylene-vinyl alcohol copolymer in the packaging material includes the following four modes shown in FIGS. 1 through 4, if it is considered that the average concentration of the vinyl alcohol units is constant.

In the first mode (i), as shown in the fusion curve of FIG. 2, only a copolymer having a constant vinyl alcohol content (62 mole %) is present, and a single peak of a peak temperature of 170° C. corresponding to the above vinyl alcohol content appears.

In the second mode (ii), as shown in the fusion curve of FIG. 3, a copolymer having a vinyl alcohol content of 64 mole % and a copolymer having a vinyl alcohol content of 60 mole % are present so that the average vinyl alcohol content of the composition as a whole is the same as in the case shown in FIG. 1, and the two peaks are substantially lapped together, the peak temperature difference (dT) is smaller than 10° C. and the co-fusion index (Ic) is larger than 0.8.

Figure 4:
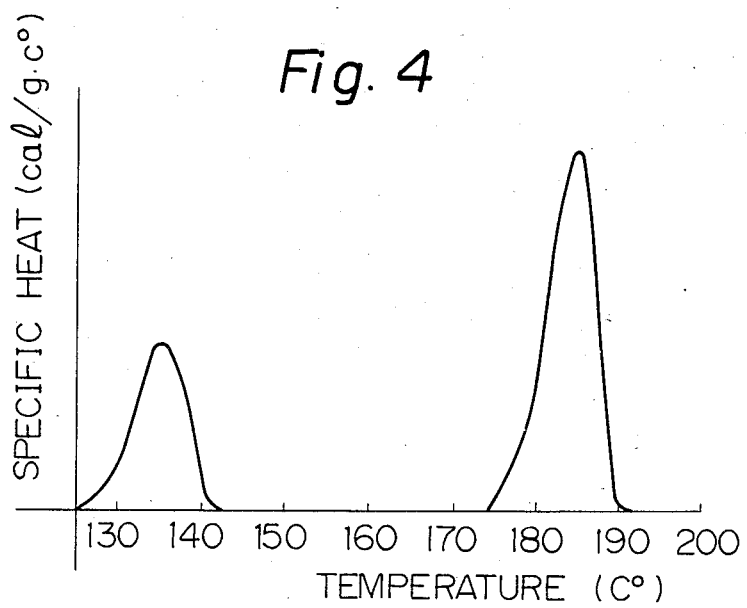

In the third mode (iii), as shown in the fusion curve of FIG. 4, a copolymer having a vinyl alcohol content of 71 mole % and a copolymer having a vinyl alcohol content of 41 mole % are present so that the average vinyl alcohol content of the composition as a whole is the same as in the case shown in FIG. 1, and the two peaks are substantially independently present or even if they are lapped together, the co-fusion index (Ic) is smaller than 0.3.

In the fourth mode (iv), the average vinyl alcohol content is the same as in each of the above-mentioned modes, but as described hereinbefore with reference to FIG. 1, the peak temperature difference (dT) is larger than 10° C. and the co-fusion index (Ic) is in the range of from 0.3 to 0.8.

With respect to each of films of the compositions of the above-mentioned four modes, the oxygen permeability under a high humidity condition ($QO_2$, 30° C., 80% RH, $cc/m^2.day.atm$), the elongation at the tensile test (E, %) and the drawing proccessability at a temperature of 150° C. and an expansion ratio of 2.0 are determined. The obtained results are shown in Table A.

TABLE A

| Mode | $QO_2$ (50 μ thickness) | Elongation (E, %) (50 μ thickness) | Drawing Processability |
| --- | --- | --- | --- |
| (i) | 4.5 | 450 | broken |
| (ii) | 4.5 | 460 | broken |
| (iii) | 4.8 | 350 | broken |
| (iv) | 3.3 | 700 | not broken |

From the results shown in Table A, when an ethylene-vinyl alcohol copolymer composition satisfying the requirements of the formulae (1) and (2) is used, the gas barrier property under a high humidity condition, the mechanical properties and the processability are highly improved over any of other ethylene-vinyl alcohol compositions.

Generally, the higher is the vinyl alcohol unit content in an ethylene-vinyl alcohol copolymer, the lower is the permeability of gases such as oxygen. On the other hand, the mechanical properties and processability of the copolymer tend to decrease with increase of the vinyl alcohol unit content.

The reason why the ethylene-vinyl alcohol copolymer composition used in the present invention has excellent gas barrier property, mechanical properties and processability has not been elucidated. However, it is believed that there will be formed a dispersed eutectic structure in which the copolymer component having a high vinyl alcohol content is a dominant factor in connection with permeation of gases and the copolymer component having a low vinyl alcohol content is a dominant factor in connection with mechanical properties or processability.

The packaging material of the present invention is advantageous in that the oxygen barrier property under a high humidity condition (a relative humidity of 80%) is highly improved. As pointed out hereinbefore, the oxygen permeation coefficient of an ethylene-vinyl alcohol copolymer is increased about 10 times under a high humidity condition. This tendency is prominent in a copolymer having a high vinyl alcohol concentration. It is believed that the reason why the composition used in the present invention shows a high gas barrier property under a high humidity condition will be that the copolymer component having a low vinyl alcohol content makes a contribution to increase of the moisture resistance.

A resin composition in which the co-fusion index (Ic) is too small and below the above-mentioned range cannot possess the above-mentioned dispersed eutectic structure, and the gas barrier property and mechanical properties of this composition are lower than those of the composition of the present invention. Furthermore, a resin composition in which the co-fusion index (Ic) is too large and is outside the above-mentioned range cannot possess the dispersed eutectic structure, and the gas barrier property, mechanical properties and processability are not substantially different from those of a single copolymer. Moreover, for a composition in which the peak temperature difference (dT) is too small and outside the above-mentioned range, no substantial improvement of the gas barrier property, mechanical properties and processability can be attained.

The composition used in the present invention may be a mixture of three or more of ethylene-vinyl alcohol copolymers. In case of this composition, the fusion characteristics are determined according to the following procedures. At first, a fusion curve of the composition by a differential scanning calorimeter is determined, and with respect to the noted two peaks, the peak temperature difference of dT=Ta−Tb is determined. Then, the base line is determined from the skirt of the high temperature side peak and the skirt of the low temperature side peak. In the case where the skirt of the noted peak (X) is not clear, a line tangential to the peak (X) at the position of the trough between the peak (X) and the peak (Y) adjacent thereto is drawn and the point where this line crosses the base line is designated as the skirt Rx of the peak (X). A line is drawn between this skirt Rx and the trough between the peaks (X) and (Y) and the area of the triangle below this line and the area of the peak (X) above this line are measured, and the co-fusion index (Ic) of the adjacent peaks (X) and (Y) is calculated from these areas. In the case where the noted peaks are not adjacent to each other, extension lines are drawn from the troughs with respect to the peaks (X) and (Y), respectively, and the crossing points of these extension lines is designated as the trough between the peaks (X) and (Y) and the areas can be calculated based on this trough. If any two peaks satisfy the requirements of the present invention, the intended functional effects of the present invention can be attained.

Incidentally, the peak temperature difference (dT) of 1.6° C. corresponds to the vinyl alcohol content difference of about 10 mole %, as is seen from the above formula (3).

It also is very important that the composition used in the present invention should have a molecular weight distribution ($\overline{Mw}/\overline{Mn}$) of at least 2.5. The molecular weight distribution referred to in the instant specification and appended claims is defined as the ratio of the weight average molecular weight to the number average molecular weight. Any of known ethylene-vinyl alcohol copolymers has a molecular weight distribution ($\overline{Mw}/\overline{Mn}$) much smaller than 2.5. In contrast, in the present invention, by using a plurality of copolymers in the form of a composition, it is made possible to broaden the molecular weight distribution to 2.5 or more. By thus broadening the molecular weight distribution, the mechanical properties are prominently improved, and for example, the elongation at break at room temperature can be increased to 500% or more. Moreover, the reduction ratio or draw ratio can be improved when various vessels are prepared, and the range of temperatures where processing is possible can be broadened. From the results shown in Examples given hereinafter, this range of the molecular weight distribution is very critical.

As pointed out hereinafter, a copolymer (A) having a high vinyl alcohol content is a dominant factor with respect to permeation of gases and a copolymer (B) having a low vinyl alcohol content is a dominant factor with respect to mechanical properties and processability. If both the copolymers (A) and (B) are combined so that the molecular weight distribution is at least 2.5, there can be attained an unexpected effect of improving mechanical properties and processability over those of the low vinyl alcohol content copolymer (B) alone.

In order to impart a molecular weight distribution ($\overline{Mw}/\overline{Mn}$) of at least 2.5 to the copolymer composition, copolymers differing in the molecular weight are used as the copolymer (A) and (B). From the viewpoint of the gas barrier property, it is preferred that a polymer having a higher molecular weight be used as the copolymer (A) and a copolymer having a lower molecular weight be used as the copolymer (B).

The blend ratio of the copolymers (A) and (B) is determined so that the requirements of fusion characteristics represented by the formulae (1) and (2) are satisfied. Ordinarily, the copolymers (A) and (B) are combined at an (A)/(B) weight ratio of from 80/20 to 20/80, preferably from 60/40 to 40/60.

Instead of the above-mentioned blending method, there may be adopted a multi-staged polymerization method for preparing the ethylene-vinyl alcohol copolymer composition used in the present invention. Ordinarily, an ethylene-vinyl alcohol copolymer is prepared by charging ethylene a vinyl ester monomer such as vinyl acetate, a solvent such as an alcohol and a peroxide type initiator, carrying out polymerization at a temperature higher than 40° C. under a pressure of up to 200 atomspheres and saponifying the resulting ethylene-vinyl acetate copolymer. The composition of the present invention is obtained according to a method in which first charged ethylene is copolymerized with vinyl acetate under a relatively low pressure of 10 to 60 atmospheres to form a copolymer or copolymer segment having a high vinyl acetate content, charging additional ethylene, carrying out copolymerization under a pressure higher by at least 5 atmospheres, especially at least 10 atmospheres, than the initial polymerization pressure to form a copolymer or copolymer segment having a low vinyl acetate content, and finally saponifying the obtained ethylene-vinyl acetate copolymer composition by known means.

In the present invention, the above-mentioned ethylene-vinyl acetate copolymer may be used singly or in the form of a blend or laminate with other resin. The packaging material of the present invention is used in the form of a packaging vessel such as a film, a pouch (bag), a cup, a tray, a bottle, a tube or a can for packaging foods, condiments, medicines, cosmetics and the like.

As the thermoplastic polymer to be used as a blend or laminate with the above-mentioned ethylene-vinyl alcohol copolymer composition, there can be mentioned a thermoplastic polymer which can be kneaded or laminated with the ethylene-vinyl alcohol copolymer composition and can be melt-molded into a film. For example, there can be used a polyolefin type polymer, a thermoplastic polymer having at least one polar group selected from carbonyl, hydroxyl and ether groups, or a mixture thereof. Specific examples are as follows.

(i) Polyolefin type polymers

There can be mentioned low density polyethylene, medium density polyethylene, high density polyethylene, an ethylene-propylene copolymer, polybutene-1, polypentene-1 and poly-4-methylpentene-1.

(ii) Thermoplastic polymers having at least one polar group selected from carbonyl, hydroxyl and ether groups As the carbonyl group-containing polymer, there is preferably used a polymer having a carbonyl group derived from a carboxylic acid, a carboxylic acid salt, a carboxylic anhydride, a carboxylic acid ester, a carboxylic acid amide, a carbonic acid ester, urea or urethane at a concentration of 10 to 1400 meq per 100 g of the polymer. This polymer may contain an ether group or a hydroxyl group in addition to the carbonyl group.

As preferred examples of the carbonyl group-containing polymer, there can be mentioned an ethyleneacrylic acid copolymer, maleic anhydride-modified polypropylene, maleic anhydride-modified polyethylene, acrylic acid ester-grafted polyethylene, an ethylenevinyl acetate copolymer, an ionomer, a partially saponified ethylene-vinyl acetate copolymer having a saponification degree of 20 to 75%, a polymer formed by grafting acrylic acid or maleic acid to the above-mentioned partially saponified copolymer, polybutylene terephthalate, a polybutylene terephthalate/polytetramethylene oxide block copolymer, polyethylene terephthalate, polylauryl lactam, polycaprolactam and a nylon 6/nylon 66 copolymer.

The copolymer (i) or (ii) may be incorporated in an amount of up to 100 parts by weight, preferably up to 100 parts by weight, per 100 parts by weight of the ethylene-vinyl alcohol copolymer composition.

In accordance with a preferred embodiment of the present invention, a packaging material is formed by laminating a layer of the above-mentioned ethylenevinyl alcohol copolymer or its blend with other resin with a layer of other resin. In this embodiment, a layer comprising the ethylene-vinyl alcohol copolymer composition is used as an intermediate layer and a thermoplastic polymer having a low water absorption is used for outer and inner layers. For example, a thermoplastic polymer having a water absorption lower than 3.5%, preferably lower than 2.5%, when allowed to stand for 5 days in an atmosphere at a temperature of 23° C. and a relative humidity of 50%, is used for the outer and inner layers. As specific examples, there can be mentioned polyolefins such as polyethylene and polypropylene, polyesters such as polyethylene terephthalate and polybutylene terephthalate, and other thermoplastic polymers.

Since it is generally difficult to directly bond the layer of the ethylene-vinyl alcohol copolymer composition to the layer of the thermoplastic polymer having a low water absorption, it is preferred that both the layers be bonded by an isocyanate type adhesive or an epoxy type adhesive, both the layers are heat-bonded through a particular adhesive layer of a carbonyl group-containing polymer such as an ethylene-acrylic acid copolymer, maleic anhydride-modified polyolefin, a polyester for an adhesive or an ionomer, or a small amount of a carbonyl group-containing polymer be blended into the layer of the polyolefin or the like in advance.

Forming may be accomplished by any of known means. For example, a film or sheet may be formed by extrusion molding, press molding, calender molding, casting or other known means. A known lamination technique such as so-called dry lamination, extrusion coating, extrusion lamination or hot melt lamination may be adopted for forming films or sheets into a laminate. Furthermore, a once-formed laminate sheet or film may be formed into a squeeze vessel by vacuum forming, compressed air forming, overlay forming or plug-assit forming.

A hollow vessel such as a bottle may be formed by preparing a single-layer or multi-layer parison, tube or preform by extrusion molding or injection molding and subjecting the parison, tube or preform to melt-blow forming in a mold or maintaining the parison, tube or preform at a drawing temperature and carrying out stretching drawing in the axial direction and expansion drawing in the circumferential direction simultaneously or sequentially.

In the present invention, a fusion curve is obtained by using a differential scanning calorimeter (Micro-DTA Standard Model No. 8025 supplied by Rigaku Denki K.K.). The temperature-elevating rate is 10° C./min and the amount of a sample is 5 to 10 mg. In order to erase the history of the sample (drawing, heat treatment and the like), annealing is performed at the first measurement, and an endothermic peak curve is determined at the second measurement.

The molecular weight distribution is determined in the following manner. Namely, a molecular weight distribution curve is determined according to a gel permeation chromatographic method using a gel permeation chromatographic apparatus (Model 150C-LC/GPC supplied by Waters Associates, Inc.), the weight average molecular weight and number average molecular weight are calculated according to a universal calibration method using polystyrene as the standard, and the molecular weight distribution is calculated from the obtained values of the weight average molecular weight and number average molecular weight.

The present invention will now be described in detail with reference to the following examples that by no means limit the scope of the invention.

EXAMPLE 1

A sheet having a thickness of 0.05 mm was prepared by extrusion molding from a composition comprising an ethylene-vinyl alcohol copolymer (EVOH) having a vinyl alcohol content of 68 mole % and a melt index (MI) of 1.3 g/10 minutes and EVOH having a vinyl alcohol content of 56 mole % and MI of 5.5 g/10 minutes at a weight ratio of about 1/1. This composition was characterized by a co-fusion index Ic of 0.48, a molecular weight distribution $\overline{Mw}/\overline{Mn}$ of 2.6, peak temperatures Ta and Tb of 180° C. and 160° C., respectively, and a vinyl alcohol content of about 62 mole % [sample (iv) in Table A].

For comparison, a sheet composed of EVOH having a vinyl alcohol content of 62 mole %, MI of 1.3 g/10 minutes and a peak temperature of 170° C. [sample (i) in Table A], a sheet composed of a composition comprising EVOH having a vinyl alcohol content of 64 mole % and EVOH having a vinyl alcohol content of 60 mole % at a weight ratio of 1/1 (Ic=0.85, Ta=173° C. and Tb=166° C.) [sample (ii) in Table A] and a sheet composed of a composition comprising EVOH having a vinyl alcohol content of 71 mole % and EVOH having a vinyl alcohol content of 41 mole % at a weight ratio of 7/3 (Ic=0, Ta=184° C. and Tb=135° C.) [sample (iii) in Table A] were prepared by extrusion molding. When the oxygen permeability, elongation and processability were examined with respect to each of these sheets, it was found that as shown in Table A given hereinbefore, the sheet (iv) of the present invention was excellent over the comparative sheets.

EXAMPLE 2

A multi-layer sheet having a thickness of 1.3 mm was prepared by co-extrusion by using a composition comprising an ethylene-vinyl alcohol copolymer (EVOH) having a vinyl alcohol content of 68 mole % and a melt index (MI) of 1.3 g/10 minutes and EVOH having a vinyl alcohol content of 56 mole % and MI of 5.5 g/10 minutes at a weight ratio of about 1/1 for the intermediate layer, homopolypropylene (PP) for the inner and outer layers and an acid-modified polyolefin for adhesive layers to be interposed between the inner layer and intermediate layer and between the outer layer and intermediate layer. The inner layer/adhesive layer/intermediate layer/adhesive layer/outer layer thickness ratio was 5/1/2/1/5.

The composition of the intermediate layer of this multi-layer sheet was characterized by a co-fusion index Ic of 0.48, a molecular weight distribution $\overline{Mw}/\overline{Mn}$ of 2.6, peak temperatures Ta and Tb of 180° C. and 160° C. and a vinyl alcohol content of about 62 mole %.

A cup having an inner side size of 105 mm (square) and a depth of 90 mm was prepared from this sheet in a forming mold at a drawing temperature of 145° to 155° C. according to the plug-assit forming method.

COMPARATIVE EXAMPLE 1

A cup having the same structure as in Example 2 was prepared under the same processing conditions as in Example 2 except that a composition characterized by Ic of 0.48, Ta of 180° C., Tb of 160° C. and $\overline{Mw}/\overline{Mn}$ of 2.3 was used for the intermediate layer.

COMPARATIVE EXAMPLE 2

A cup having the same structure as in Example 2 was prepared under the same processing conditions as in Example 2 except that a composition characterized by Ic of 0.17, Ta of 180° C., Tb of 160° C. and $\overline{Mw}/\overline{Mn}$ of 2.6 was used for the intermediate layer.

COMPARATIVE EXAMPLE 3

A cup having the same structure as in Example 2 was prepared under the same processing conditions as in Example 2 except that EVOH having a vinyl alcohol content of 62 mole %, MI of 1.3 g/10 minutes and a peak temperature of 170° C. was used for the intermediate layer.

The results obtained in Example 2 and Comparative Examples 1 through 3 are shown in Table B.

minutes at a weight ratio of about 4/6 for the intermediate layer, homopolypropylene having a density of 0.90 g/cm³ and MI of 10.8 g/10 minutes for the inner and outer layers and maleic anhydride-modified polyolefin having a carbonyl group concentration of 80 meq/100 g of the polymer for adhesive layers to be interposed between the inner and intermediate layers and between the intermediate and outer layers. The inner layer/adhesive layer/intermediate layer/adhesive layer/outer layer thickness ratio was 10/1/2/1/15.

The composition of the intermediate layer of this multi-layer pipe was characterized by a co-fusion index of 0.54, a molecular weight distribution $\overline{Mw}/\overline{Mn}$ of 2.7, peak temperatures Ta and Tb of 180° C. and 170° C. and a vinyl alcohol content of 66 mole %.

This multi-layer pipe was cut in a predetermined length, heated at a drawing temperature of 163° to 168° C. and formed into a drawn bottle having an inner volume of 1000 cc at a longitudinal draw ratio of 2.4, 3.1 or 3.5 and at a lateral draw ratio of 3.0.

COMPARATIVE EXAMPLE 4

A drawn bottle having the same structure as in Example 3 was prepared under the same processing condi-

TABLE B

| Sample | Draw Ratio (Expansion Ratio) | Ic | $\overline{Mw}/\overline{Mn}$ | Ta (°C.) | Tb (°C.) | Oxygen Permeability*1 (cc/m² · day · atm) | Processability *2 |
| --- | --- | --- | --- | --- | --- | --- | --- |
| Example 2 | | | | | | | |
| A | 2.0 | 0.48 | 2.6 | 180 | 160 | 5 | not broken at all |
| B | 3.8 | 0.48 | 2.6 | 180 | 160 | 7 | not broken at all |
| C | 5.0 | 0.48 | 2.6 | 180 | 160 | 8 | not broken at all |
| Comparative Example 1 | | | | | | | |
| D | 2.0 | 0.48 | 2.3 | 180 | 160 | 18 | 50% broken |
| E | 3.8 | 0.48 | 2.3 | 180 | 160 | 25 | completely broken |
| Comparative Example 2 | | | | | | | |
| F | 2.0 | 0.17 | 2.6 | 180 | 160 | 24 | 70% broken |
| G | 3.8 | 0.17 | 2.6 | 180 | 160 | 30 | completely broken |
| Comparative Example 3 | | | | | | | |
| H | 2.0 | — | — | (170) | — | 25 | 70% broken |
| I | 3.8 | — | — | (170) | — | 27 | completely broken |

Note
*1: The oxygen permeability of the cup was measured in the following manner.
A gas permeation tester was used. A sample was fixed between two chambers. One chamber was evacuated until the pressure was reduced below 10⁻² mmHg (low pressure side). The atmosphere of the other chamber (high pressure side) was substituted with oxygen gas under a pressure of 1 atmosphere. The change of the pressure increase with the lapse of time on the low pressure side was read by a recorder, and the oxygen permeability QO₂ was determined. The measurement was carried out at a temperature of 30° C. while maintaining the relative humidity at 80% on the high pressure side. The measurement was conducted on 3 specimens, and an average value was calculated.
*2: The section of the corner portion (highly drawn portion) of the cup was cut, and the cut end face was dipped in a dye solution and it was checked whether or not EVOH was broken. The test was conducted on 10 specimens.

EXAMPLE 3

A multi-layer pipe having a thickness of 4.0 mm was prepared by co-extrusion by using a composition comprising EVOH having a vinyl alcohol content of 71 mole % and MI of 1.5 g/10 minutes and EVOH having a vinyl alcohol content of 62 mole % and MI of 8.0 g/10 tions as in Example 3 except that EVOH having a vinyl alcohol content of 66 mole %, MI of 1.3 g/10 minutes and a peak temperature of 176° C. was used for the intermediate layer.

The results obtained with respect to the bottles of Example 3 and Comparative Example 4 are shown in Table C.

TABLE C

| Longitudinal Draw Ratio | Average Thickness (μ) of Intermediate Layer | Oxygen Permeability *1 (cc/m² · day · atm) | State of Intermediate Layer *2 | Falling Strength *3 | Appearance *4 |
| --- | --- | --- | --- | --- | --- |
| Example 3 | | | | | |
| 2.4 | 20 | 1.5 | O | good | good |

TABLE C-continued

| Longitudinal Draw Ratio | Average Thickness (μ) of Intermediate Layer | Oxygen Permeability *1 (cc/m² · day · atm) | State of Intermediate Layer *2 | Falling Strength *3 | Appearance *4 |
| --- | --- | --- | --- | --- | --- |
| 3.1 | 17 | 2.1 | O | good | good |
| 3.5 | 14 | 3.2 | O | good | good |
| Comparative Example 4 | | | | | |
| 2.4 | 20 | 2.8 | Δ | cracks in intermediate layers | uneven |
| 3.1 | 17 | 16.9 | X | cracks in intermediate layers | uneven, longitudinal streaks |
| 3.5 | 14 | 18.1 | X | many cracks in intermediate layer | uneven, many longitudinal streaks |

Note
*1: The atmosphere of the bottle to be measured was replaced by $N_2$ gas in vacuum, and the mouth portion of the bottle was sealed by a rubber plug. The bottle was kept for a certain time in a thermostat chamber maintained at a temperature of 30° C. and a relative humidity of 80%. The concentration of oxygen which had permeated into the bottle was determined by gas chromatography. The oxygen permeability $QO_2$ was calculated according to the following formula:

$$QO_2 = \frac{m \times \frac{Ct}{100}}{t \times Op \times A} \ (cc/m^2 \cdot day \cdot atm)$$

wherein m stands for the amount (cc) of $N_2$ gas filled in the bottle, t stands for the storage period (days) in the thermostat tank, Ct represents the oxygen concentration (% by volume) after the passage of t days, A represents the effective surface area ($m^2$) of the bottle, and Op stands for the partial pressure (atm) of oxygen gas (0.209 atmosphere).
*2: The vessel was cut, and the cut section was dyed and the state of the intermediate layer was examined and evaluated according to the following scale:
O: good
Δ: large variation of thickness
X: broken
*3: The bottle was filled with saline water and stored at −5° C. for 24 hours. Then, the bottle was let to fall down on a concrete floor from a height of 1.5 m. This falling was repeated 10 times.
*4: The appearance was visually examined and evaluated.

EXAMPLE 4

A multi-layer pipe was prepared by co-extrusion by using a composition comprising EVOH having a vinyl alcohol content of 68 mole % and MI of 1.3 g/10 minutes and EVOH having a vinyl alcohol content of 56 mole % and MI of 5.5 g/10 minutes at a weight ratio of about 1/1 for the intermediate layer, polyethylene terephthalate having an intrinsic viscosity of 0.82 for the inner and outer layers and a copolyester type adhesive for the adhesives layers to be interposed between the inner and intermediate layers and between the intermediate and outer layers. The inner layer/adhesive layer/intermediate layer/adhesive layer/outer layer thickness ratio was 10/1/3/1/15.

The composition of the intermediate layer of this multi-layer pipe was characterized by a co-fusion index Ic of 0.5, a molecular weight distribution $\overline{Mw}/\overline{Mn}$ of 2.6, peak temperatures Ta and Tb of 180° C. and 160° C. and a vinyl alcohol content of 62 mole %.

This multi-layer pipe was cut in a predetermined length, and one end was closed by fusion bonding to form a bottomed parison (preform). This bottomed parison was heated at a drawing temperature of 90° to 105° C. and drawn at a longitudinal draw ratio of 2.1 and a lateral draw ratio of 3.0 to form a multi-layer bottle having an inner volume of 1000 cc.

The bottle was tested in the same manner as in Example 3 to check formation of cracks in the intermediate layer (composition layer) and evaluate the falling strength and appearance. No defects were observed and good results were obtained.

EXAMPLE 5

A multi-layer film having a thickness of 0.12 mm was prepared by co-extrusion according to the inflation method by using a composition comprising EVOH having a vinyl alcohol content of 68 mole % and MI of 1.3 g/10 minutes and EVOH having a vinyl alcohol content of 58 mole % and MI of 5.7 g/10 minutes at a weight ratio of about 6/4 for the intermediate layer, linear low density polyethylene having a density of 0.92 g/cm² and MI of 7.2 g/10 minutes for the inner and outer layers and acid-modified polyethylene for the adhesive layers to be interposed between the inner and intermediate layers and between the intermediate and outer layers. The inner layer/adhesive layer/intermediate layer/adhesive layer/outer layer thickness ratio was 10/1/3/1/10.

The composition of the intermediate layer of this multi-layer film was characterized by a co-fusion index Ic of 0.48, a molecular weight distribution $\overline{Mw}/\overline{Mn}$ of 2.5, peak temperatures Ta and Tb of 180° C. and 163° C. and a vinyl alcohol content of 64 mole %.

The multi-layer film was cut into two square samples having a side of 500 mm. The two film samples were lapped after a tapping opening had been attached to one film sample, and the four sides were sealed to form an inner bag for a bag-in-box.

This bag was filled with 10 l of saline water and packed in a carton case. The falling test was carried out by letting the carton to fall down on a concrete floor from a height of 120 cm. No cracks were formed in the composition layer (the test was conducted on 10 sample bags).

For comparison, a bag was prepared in the same manner as described above except that EVOH having an ethylene content of 68 mole % and MI of 1.3 g/10 minutes was used instead of the EVOH composition for the intermediate layer, and the bag was similarly subjected to the falling test. Cracks were formed in the intermediate EVOH layer and the appearance was degraded.

We claim:

1. A packaging material having at least one layer comprising an ethylene-vinyl alcohol copolymer having a vinyl alcohol content of 40 to 80 mole % and a residual vinyl ester content lower than 4 mole %, wherein the ethylene-vinyl alcohol copolymer consists of a composition comprising a plurality of ethylene-vinyl alcohol copolymers differing in the vinyl alcohol content, said composition shows a plurality of endothermic peaks in a fusion curve by a differential scanning calorimeter, the composition has fusion characteristics satisfying requirements represented by the following formulae:

$$0.8 \geq \frac{Sc}{Sa + Sb + Sc} \geq 0.3$$

and $$25°\ C. \geq Ta - Tb > 10°\ C.$$

wherein Sc represents an area of a triangle defined by a base line connecting the skirt of a high temperature side peak to the skirt of a low temperature side peak in two adjacent peaks in said fusion curve and lines connecting the skirts of both the peaks to the trough between both the peaks, Sa represents an area of the high temperature side peak above said triangle, Sb represents an area of the low temperature side peak above said triangle, Ta represents a peak temperature of the high temperature side peak and Tb represents a peak temperature of the low temperature side peak,
and the composition has a molecular weight distribution ($\overline{Mw}/\overline{Mn}$) of at least 2.5.

2. A packaging material as set forth in claim 1, wherein the residual vinyl ester content is lower than 1 mole %.

3. A packaging material as set forth in claim 1, wherein said composition has fusion characteristics satisfying requirements represented by the following formulae:

$$0.6 \geq \frac{Sc}{Sa + Sb + Sc} \geq 0.35$$

and $$15°\ C. \leq Ta - Tb \leq 25°\ C.$$

wherein Sa, Sb, Sc, Ta and Tb are as defined.

4. A packaging material as set forth in claim 1, wherein said composition comprises (A) an ethylene-vinyl alcohol copolymer having a higher vinyl alcohol content and a higher molecular weight and (B) an ethylene-vinyl alcohol copolymer having a lower vinyl alcohol content and a lower molecular weight at an (A)/(B) weight ratio of from 80/20 to 20/80.

5. A packaging material as set forth in claim 1, wherein said composition is blended with or laminated with a polyolefin type polymer or a thermoplastic polymer containing at least one polar group selected from carbonyl, hydroxyl and ether groups.

6. A packaging material as set forth in claim 1, which has a laminate structure including an intermediate layer composed of said composition and inner and outer layers composed of a thermoplastic polymer having a low water absorption.

7. A packaging material as set forth in claim 1 wherein said ethylene-vinyl alcohol copolymer comprises a first ethylene-vinyl alcohol copolymer having a vinyl alcohol content of 68 mole% and a melt index of 1.3 g/10 min. and a second ethylene-vinyl alcohol copolymer having a vinyl alcohol content of 56 mole%, and a melt index of 5.5 g/10 min., said first and second copolymers being present at a weight ratio of about 1/1, said composition having a co-fusion index Ic of 0.48, a molecular weight distribution $\overline{Mw}/\overline{Mn}$ of about 2.6, peak temperature Ta and Tb of 180° C. and 160° C., respectively, and a vinyl alcohol content of about 62 mole%.

8. A packaging material as set forth in claim 1 wherein the ethylene-vinyl alcohol copolymer comprises a first copolymer having a vinyl alcohol content of 71 mole% and a melt index of 1.5 g/10 min. and a second copolymer having a vinyl alcohol content of 62 mole% and a melt index of 8.0 g/10 min. at a weight ratio of the first and second copolymers of about 4/6, the ethylene vinyl alcohol copolymer composition having a co-fusion index Ic of 0.54, a molecular weight distribution $\overline{Mw}/\overline{Mn}$ of 2.7, peak temperatures Ta and Tb of 180° C. and 170° C., respectively, and a vinyl alcohol content of 66 mole%.

9. A packaging material as set forth in claim 1 wherein the ethylene-vinyl alcohol copolymer composition comprises a first copolymer having a vinyl alcohol content of 68 mole% and a melt index of 1.3 g/10 min., and a second copolymer having a vinyl alcohol content of 58 mole% and a melt index of 5.7 g/10 min. at a weight ratio of the first copolymer to the second copolymer of about 6/4, said copolymer composition having a co-fusion index Ic of 0.48, a molecular weight distribution $\overline{Mw}/\overline{Mn}$ of 2.5, peak temperatures Ta and Tb of 180° C. and 163° C., respectively, and a vinyl alcohol content of 64 mole%.

* * * * *